(12) United States Patent
Radziuk

(10) Patent No.: US 7,167,238 B2
(45) Date of Patent: Jan. 23, 2007

(54) ATOM ABSORPTION SPECTROSCOPY METHOD AND ATOM ABSORPTION SPECTROMETER

(75) Inventor: Bernhard H. Radziuk, Frickingen (DE)

(73) Assignee: PerkinElmer Singapore Pte. Ltd., Singapore (SG)

( * ) Notice: Subject to any disclaimer, the term of this patent is extended or adjusted under 35 U.S.C. 154(b) by 0 days.

(21) Appl. No.: 11/272,840

(22) Filed: Nov. 14, 2005

(65) Prior Publication Data

US 2006/0066849 A1    Mar. 30, 2006

Related U.S. Application Data

(63) Continuation of application No. 10/372,739, filed on Feb. 24, 2003, now Pat. No. 6,977,725.

(30) Foreign Application Priority Data

Feb. 22, 2002 (DE) ................................. 102 07 742

(51) Int. Cl.
*G01J 3/42* (2006.01)
*G01N 21/31* (2006.01)
(52) U.S. Cl. ........................ 356/319; 356/315
(58) Field of Classification Search ........... 356/307, 356/312, 315, 316, 319
See application file for complete search history.

(56) References Cited

U.S. PATENT DOCUMENTS

| 4,545,680 A | 10/1985 | Smith | 356/319 |
| 4,856,898 A | 8/1989 | Becker et al. | 356/328 |
| 6,222,626 B1 | 4/2001 | Radziuk et al. | 356/307 |
| 6,977,725 B2 * | 12/2005 | Radziuk | 356/319 |

FOREIGN PATENT DOCUMENTS

EP    0 084 931 A2    7/1983

* cited by examiner

Primary Examiner—F. L. Evans
(74) Attorney, Agent, or Firm—St. Onge Steward Johnston & Reens LLC

(57) ABSTRACT

Atom absorption spectroscopy method generates at least one first beam of monochromatic radiation at a certain wavelength. Radiation is separated into a test beam and a reference beam, and only the test beam is led through a test area. Subsequently, both beams pass through a slot system into a monochromator, and after their spectral breakdown, reach a detector system. In order to improve such atom absorption spectroscopy method in a way that allows the test beam and the reference beam as well as their spectra to be guided close to, or adjacent to one other onto the detector system, and, at the same time enables a simple and easy adaptation of the spectrometer's effective spectral range to a monochromator's characteristics, the test beam and the reference beam thus pass through different slots in the slot system and are projected onto essentially spatially separate areas of the detector system, with their spectra's broken-down.

8 Claims, 2 Drawing Sheets

ATOM ABSORPTION SPECTROSCOPY METHOD AND ATOM ABSORPTION SPECTROMETER

CROSS REFERENCE TO RELATED PUBLICATIONS

This application is a continuation patent application of U.S. patent application Ser. No. 10/372,739 for "Atom Absorption Spectroscopy Method And Atom Absorption Spectrometer," filed Feb. 24, 2003, now U.S. Pat. No. 6,977,725 which claims priority of pending German Application No. 10207742.8 filed on Feb. 22, 2002.

FIELD OF THE INVENTION

The invention relates to atom absorption spectroscopy method and cor-responding atom absorption spectrometer.

BACKGROUND OF THE INVENTION

A method like this, or alternatively, a corresponding device, is known from EP 0084391. Within this context, a radiation source, such as a hollow cathode lamp or a discharge lamp without electrodes, generates monochromatic radiation, which is separated by a beam separator into a test (sample) beam and a reference beam. The test beam is led through a test area in which a sample is atomized by means of a flame. The atomized sample absorbs part of the radiation, and the quantity of radiation absorbed represents a qualitative measure (unit of measurement) for the concentration of the element in the sample that is to be analyzed. Following the test area, the test beam is transferred through a series of optical elements and reunited the radiation is created. After leaving the monochromator, the spectrally dissected radiation hits a detector system.

Other atom absorption spectrometers are known, which reunite a test beam and a reference beam through a chopper, while the beams' intensities are determined in correspondence to the chopper's frequency.

Another known system consists of atom absorption spectrometer containing movable mirrors, which either allow a single beam to pass through the test area or deflect it in order to circumvent it. The reference beams' intensities are therefore measured between the test beams' intensities, with the measuring frequency based on the mirror's movement. It has to be noted, though, that any change in the mirrors' position results in a direct change of the beams' intensity and therefore leads to a shift in the base lines.

Finally, it is also known to periodically remove the test area, or, alternatively, the burner mounted in it, including the accompanying flame, from the orbit of the test beam. With this, however, frequency is comparatively low and demands an exact control of the burner's movement to avoid changes in sensitivity. Additionally, the measurements of the reference's intensity in the test area might be affected by the operator's activities.

SUMMARY OF THE INVENTION

An additionally known atom absorption spectrometer also operates with a test beam and a reference beam, with both beams being spatially separated. Both beams are led through a slot into a Littrow monochromator and subsequently hit a detector system. This atom absorption spectrometer has the advantage of representing a comparatively simple optical system, in which the measuring time can be optimally utilized, enabling a simultaneous measurement of both beams at the same time.

With regard to EP 0084391, the patent applied for here is aimed at improving a known atom absorption spectroscopy method and a known atom absorption spectrometer in a way that allows the test beam and the reference beam to be guided close to each other and, at the same time, enables their respective spectra to be projected close to each other onto a detector system. At the same time, this also enables the spectrometer's effective spectral range to be easily adapted to the monochromator's characteristics.

According to this method, this task is fulfilled when the test beam and the reference beam pass through separate slots of the slot system, are broken down spectrally, and hit essential spatially separated areas of the detector system.

According to the device, this task is fulfilled when the slot system features at least two slots for the separate penetration of the test beam and the reference beam, and when the beams' isolated ranges of wave length are spatially separate when they hit the detector system.

The separate slots for the test beam and the reference beam, and the resulting separate slot sizes for each beam, might be easily utilized in order to vary the monochromator's effective spectral range. Furthermore, the beams are separated spatially and not in terms of time, so that complicated devices for a chronological separation, such as a chopper or something similar, become obsolete.

In order to at least enable a sequential multiple element analysis, the first beam might be created, for the purpose of selecting a suitable wavelength, by selecting different radiation sources. These may be arranged on a carousel or carousel-like device and may be positioned in a way that enables the beams they produce to be injected into the atom absorption spectrometer.

In order to provide different slot sizes, the slot system may possess a number of choices of slots, especially if these are arranged in pairs, for the separate passage of the test and the reference beams. After selection, the according slot pair is brought into position, and the slot size defined by the pair causes a variation of the monochromator's effective spectral range.

In order to easily position the slot pairs, they may be arranged on a pivotal slot disc.

The slot disc may be rotated manually. In order to automatically adjust the slot disc, it may be attached to a driving device. Such a driver may, for example, be an electric step-by-step engine, or something similar to it.

In order to achieve an essentially rectangular arrangement of detectors, it may be useful for the slot to have a rhomboid cross-section.

An optical deflection device for the deflection or diversion of the first beam in the direction of the beam separator may be devised in order to achieve a compact atom absorption spectrometer. This reduces the physical distance between the corresponding radiation source and the beam separator.

Within this context, it may also be considered of further advantage to arrange a series of optical elements in the orbit of the test as well as in the orbit of the reference beams for the purpose of deflection and/or focusing. This too may result in a more compact design of the atom absorption spectrometer, with the beams being deflected accordingly, and focused within the spectrometer.

If there is a need to measure either only the test beam's or reference beam's spectra, the test beam and/or reference beams may be temporarily interrupted, especially before passing through the slot system. A beam interrupter device that is located in a suitable position may achieve this.

A prime example of a simply designed beam interrupter device may be a magnetically operable closing blind.

In order to separate the spectra of the test and reference beams in a simple manner, the monochromator may generate a two-dimension spectrum.

A simple and cost effective realization of such a monochromator may be achieved by at least one Echelle grid and one dispersion prism. The very high dispersion of such a monochromator can be used to increase geometrical beam passage in the atom absorption spectrometer. The dispersion prism is mounted behind the Echelle grid and its dispersion occurs orthogonally in relation to the grid. Such a two-dimensional spectrum enables the two components (the Echelle grid and the dispersion prism) to compensate for each other's positioning errors. Furthermore, the monochromator's effective spectral range may be altered by the size of the corresponding slot in a way that the range matches the characteristics of the Echelle spectra.

Maximizing crosswise dispersion with the help of the dispersion prism provides the opportunity to utilize the dark space between the spectra's different orders to measure the reference spectra. Additionally, the monochromator may be operated with the maximum signal/noise relation in any given situation, since the spectral lines emitted by the radiation source are comparatively weak.

In order to correct the measuring results in response to changes in the background, a second, non-monochromatic beam may be injected into the atom absorption spectrometer for purposes of background compensation, especially in a chronologically shifted manner (at a time difference) in relation to the first beam. This may be achieved by at least one additional radiation source, such as a $D_2$ radiator (to state one example). Such a second beam may be analogous to the first beam, and may also be separated into a test beam and a reference beam by means of the beam separator.

The detector system may possess multiple detection areas with numerous detector elements, in order to measure different orders of the spectra at the same time, or to at least measure spectra for the test and the reference beams simultaneously.

In order to be able to measure each order of the spectral breakdown precisely and separately, each detector area may be charged by at least one order of the spectral breakdown.

Two detector areas may each be arranged in a staggered manner in relation to the corresponding slot pair, in order to enable a quick and precise measurement when the slot pairs are projected onto the surface of the detector system.

Detector elements may, for example, be semi-conductive photo detectors or ideally photo diodes. It is also possible to use CCD (charge coupled devices) or CID (charge injection devices) as semi-conductive photo detectors.

It has already been pointed out that with a maximized cross-wise dispersion of the monochromator, comprised of Echelle grid and dispersion spectra, the dark space between the spectra's orders may be utilized to measure the reference spectra. In this case, the spectra of the test beam and the reference beam are projected onto the detector system, spaced in an essentially staggered manner in relation to each other. Yet the spectra may still overlap, either partially or at least in the areas of other orders.

BRIEF DESCRIPTION OF THE DRAWINGS

Based on the figures of the attached illustrations, the following explains an advantageous version of the invention.

DETAILED DESCRIPTION OF THE INVENTION

Figure 1:
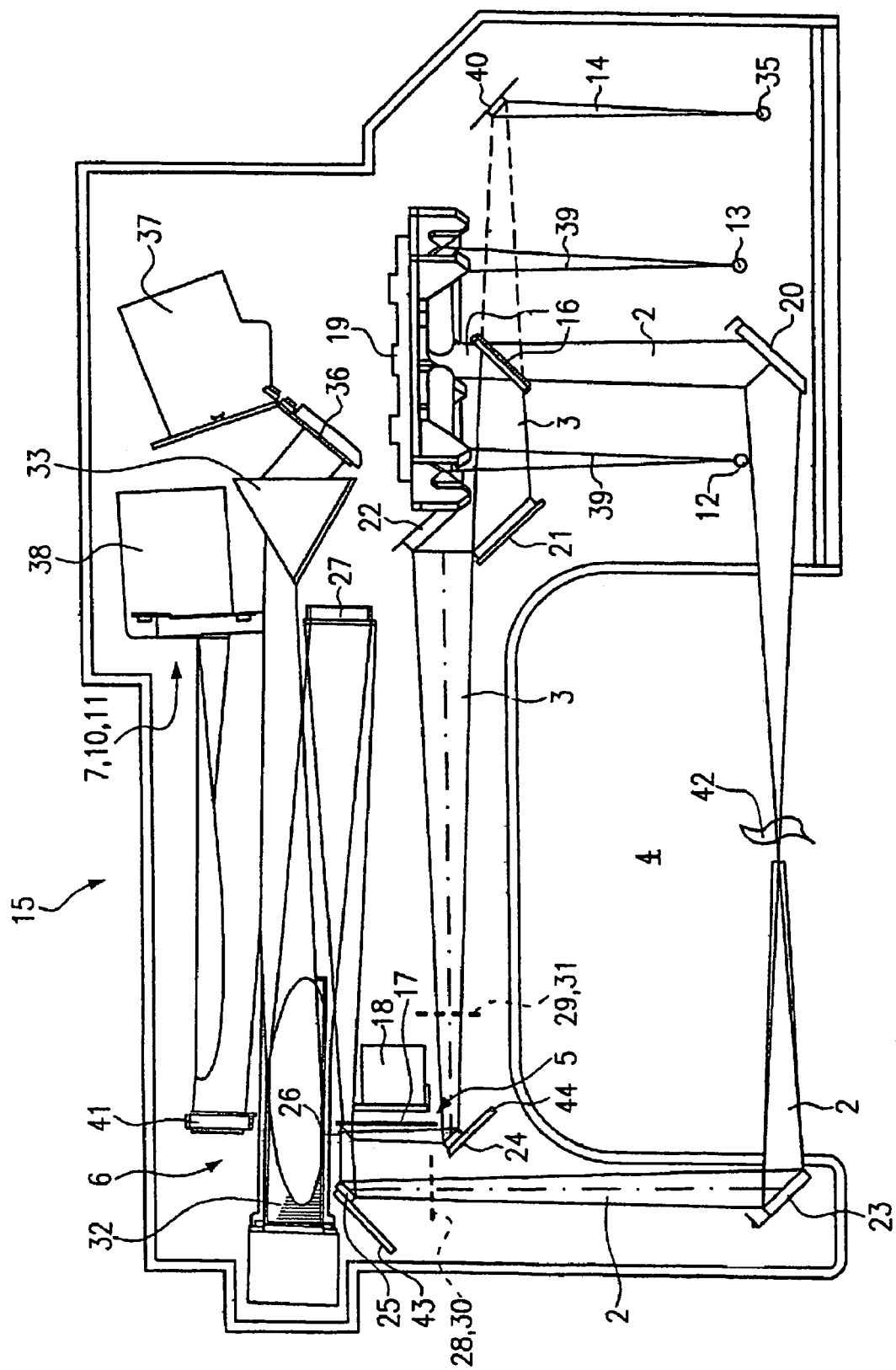
FIG. 1 shows a view from above upon the sample version of atom absorption spectrometer based on the invention at issue.

FIG. 1 shows a view from above the sample version of atom absorption spectrometer 15 based on the invention. It features a test area 4, in which, for example, a flame 42 is located for the purpose of atomizing a sample which is to be analyzed. Additionally, the atom absorption spectrometer 15 contains a number of radiation sources: 12 and 13. Besides the two depicted radiation sources, additional radiation sources may exist. The radiation sources emit an essentially monochromatic primary radiation 39, which, depending on which radiation source (12 or 13) is employed, hits a deflection device 19. On the bottom side that faces the radiation sources 12 and 13, the deflection device features a number of optical deflection means, such as mirrors or prisms. These reflect the corresponding primary beam 39 into the direction of a beam separator 16, in the form of a first beam 1. The beam separator 16 separates the first beam 1 into a test beam 2 and a reference beam 3.

By means of a toroid or ring mirror 20, the test beam 2 is deflected into the direction of the test area 4 where it is focused in the area of the flame 42. Part of the test beam 2 is absorbed within the flame 42, and the test beam with its now weakened intensity leaves the test area 4 and is reflected and focused through another toroid or ring mirror 23 into the direction of a flat mirror 25.

The flat mirror 25 is mounted on a clamping device 43 in a flexible manner. The flat mirror 25 deflects the test beam 2 in the direction of a slot system 5. After passing through a slot in slot system 5, the test beam hits a collimator 27. From there, the test beam is deflected into the direction of a monochromator 6, which consists of an Echelle grid 32 and a dispersion prism 33. The dispersion prism 33 is mounted behind the Echelle grid 32 and features, on the side facing away from the Echelle grid 32, a prism mirror 36. The latter can be adjusted by means of an adjustment device 37.

The test beam is projected from the dispersion prism 33 onto another collimator 41, and from there is focused on the surface of a detector system 7, consisting of detector areas 10 and 11.

A suitable electronic measuring and evaluation device is mounted on the side facing away from the detector system 7.

The reference beam 3 produced by the radiation separator 16 is deflected via a flat mirror 21 onto a toroid or ring mirror 22, which again deflects it into the direction of a flat mirror 24 where it is focused. From the flat mirror 24, which is also mounted on a clamping device 44 in an adjustable manner, the reference beam 3 is deflected into the direction of yet another flat mirror 26. Finally, the reference beam 3 is led from the flat mirror 26 through a slot of the slot system 5 into the direction of a collimator 27. From there, the reference beam follows a route analogous to the one followed by the test beam 2, i.e., it is led to the monochromator 6 and subsequently, from there via another collimator 41 to the detector system 7.

The slot system 5 is designed as a slot disc 17. This disc may be rotated through an attached driving device 18.

For purposes of backgound compensation during measurements with the detector system 7, another radiation source 35 is designed. This source emits a second, non-monochromatic beam 14. Following deflection by a flat mirror 40, the second beam 14 is separated into a test beam and a reference beam, analogous to the first beam 1. In relation to the first beam, the second beam 14 is emitted at a time interval. The spectra of the first and second beams, and the spectra of their respective test and reference beams are registered by the detector system 70, at corresponding time intervals.

The radiation source 35 usually is a $D_2$ radiation source, and radiation sources 12, 13 may consist of discharge lamps without electrodes or hollow cathode lamps.

If it is necessary to interrupt the test and/or reference beams 2 and 3, to measure only one beam through the detector system 7, beam interrupter devices 28, 29 are positioned in the orbit of the test beams and/or in the orbit of the reference beams 2 and 3. Such beam interrupter devices 28, 29 are designed as a magnetically operable closing blind 30 and 31.

Figure 2:
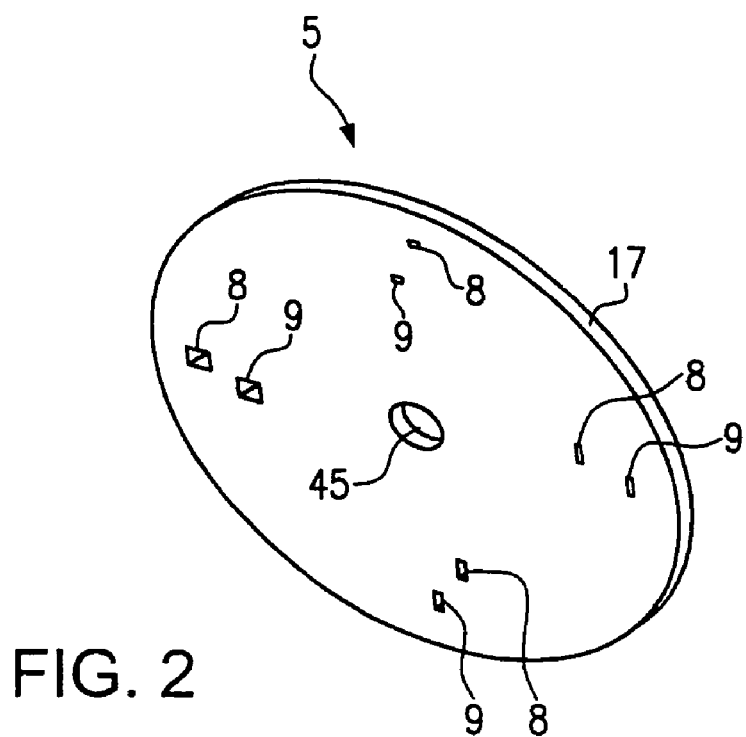
FIG. 2 shows a slanted perspective from above onto a slot disc.

FIG. 2 shows a slanted perspective from above onto a slot disc 17, serving as a slot system 5 following FIG. 1. This disc features a central drilling hole 45 for the reception of a drive shaft 18, following FIG. 1. In the slot disc 17, the sample design shows four pairs of slots 8 and 9. One of the slots is assigned to the test beam 2, and the other slot to the reference beam 3. The beams in question each pass through the slots, the latter seen in FIG. 1 as arranged at the slot disc's 17 top. At the same time, the slots 8 and 9 are positioned in a staggered manner in relation to each other, both in radial direction and vertically in relation to the radial direction. The slots of the various slot pairs have different sizes. The cross-section of the respective slots is approximately rhomboid. The slot sizes cause a variation of the effective spectral range of the Echelle spectrometer, which consists of the Echelle grid 32 and the dispersion prism 33.

Figure 3:
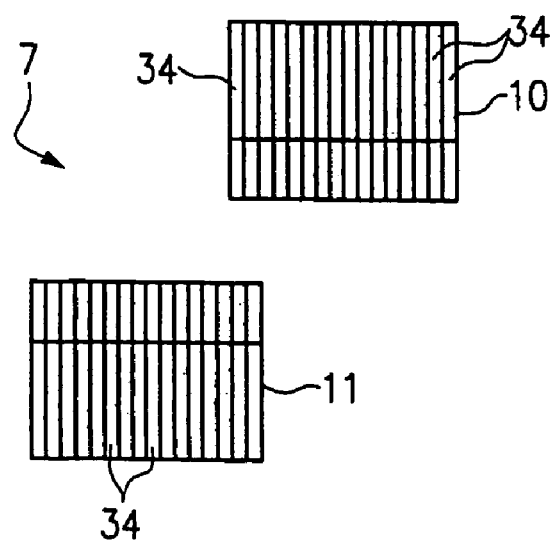
FIG. 3 shows a view from above onto two detector areas

FIG. 3 shows a simplified view from above onto a detector system 7 with two detector areas 10 and 11. Of course it is possible to arrange for more than two detector areas 10 and 11, with each of these detector areas possessing a multitude of detector elements 34, such as photo diodes, to state one obvious example. In relation to each other, the detector areas 10 and 11 are positioned analogous to the slot pairs 8 and 9. They are also positioned laterally and directed upwards in a staggered manner. For example, detector area 10 is assigned to slot 8 and detector area 11 to slot 9. This way, the test and reference beams 2 and 3, when passing through the corresponding slot pair 8 and 9, are separated, and their spectral breakdown can be measured through the detector areas 10 and 11.

What is claimed is:

1. An atomic absorption spectroscopy method comprising:
   separating quasi-monochromatic radiation into a first test beam and a first reference beam;
   directing the first test beam to a test area wherein the first test beam interacts with an atomized material sample for analysis of the sample;
   spatially segregating the first test beam and the first reference beam by directing the first test beam and the first reference beam through spatially segregated apertures;
   spectrally isolating a segment of the first test beam;
   spectrally isolating a segment of the first reference beam;
   separating non-monochromatic radiation into a second test beam and a second reference beam;
   directing the second test beam to the test area wherein the second test beam interacts with an atomized material sample for analysis of the sample;
   spatially segregating the second test beam and the second reference beam;
   spectrally isolating a segment of the second test beam;
   spectrally isolating a segment of the second reference beam;
   interrupting the first test beam or first reference beam for measuring a single beam through a detector.

2. The method as set forth in claim 1, wherein spatially segregating the second test beam and the second reference beam comprises directing the second test beam and the second reference beam through a second set of spatially segregated apertures.

3. The method as set forth in claim 2 further comprising varying a dimension of the second set of apertures.

4. The method as set forth in claim 1, further comprising spectrally isolating a segment of the test and reference beams using a spectrum analyzer.

5. The method as set forth in claim 1, further comprising spectrally isolating a segment of the test and reference beams using a monochromator.

6. The method as set forth in claim 1, further comprising providing at least four pairs of apertures where each pair receives a test beam and a reference beam.

7. The method as set forth in claim 1, further comprising detecting the spectrally isolated segment of the first test and first reference beams or the spectrally isolated segment second test and second reference beams using a detector receptive of the first test and first reference beams or the second test and second reference beams.

8. The method as set forth in claim 1, wherein interrupting the first test beam or first reference beam includes placing a beam interrupter device in an orbit of the first test beam or first reference beam.

* * * * *